United States Patent [19]

Hamada et al.

[11] 4,221,435

[45] Sep. 9, 1980

[54] SIMULATED WHEEL COVER ASSEMBLY

[76] Inventors: Roy Hamada, 5771 Vinevale Cir., La Palma, Calif. 90623; Tad Sakai, 1106 W. Hill St., Fullerton, Calif. 92633; Wen P. Liu, 96-98 Section 1 Nanking East Rd., Taipei, Taiwan

[21] Appl. No.: 34,618

[22] Filed: Apr. 30, 1979

[51] Int. Cl.³ ............................................. B60B 7/00
[52] U.S. Cl. ............................. 301/37 SS; 301/37 SC; 24/81 CC
[58] Field of Search ........... 301/37 R, 37 CM, 37 SS, 301/37 S, 37 SC; 24/81 CC

[56] References Cited

U.S. PATENT DOCUMENTS

| | | | |
|---|---|---|---|
| 2,699,361 | 1/1955 | Jenkins | 301/37 SS |
| 3,965,708 | 6/1976 | Smiley | 301/37 AT |
| 4,061,400 | 12/1977 | D'Angelo | 301/37 SS |

*Primary Examiner*—H. Grant Skaggs
*Attorney, Agent, or Firm*—I. Morley Drucker

[57] ABSTRACT

This invention is directed to a vehicle wheel assembly structure having simulated wheel centers, and comprises a two-piece spoked basket assembly which is centrally held to a wheel body. The basket assembly includes an outer frusto-conically shaped spoked basket and an inner generally planar spoked basket, the radially outer rims of which nest within each other and are held to the tire rim by a centrally located mounting. The purpose of having a two-piece basket assembly is to enable each of the basket types to be stacked for economical and efficient handling, shipping and storage.

6 Claims, 11 Drawing Figures

U.S. Patent  Sep. 9, 1980  Sheet 1 of 2  4,221,435
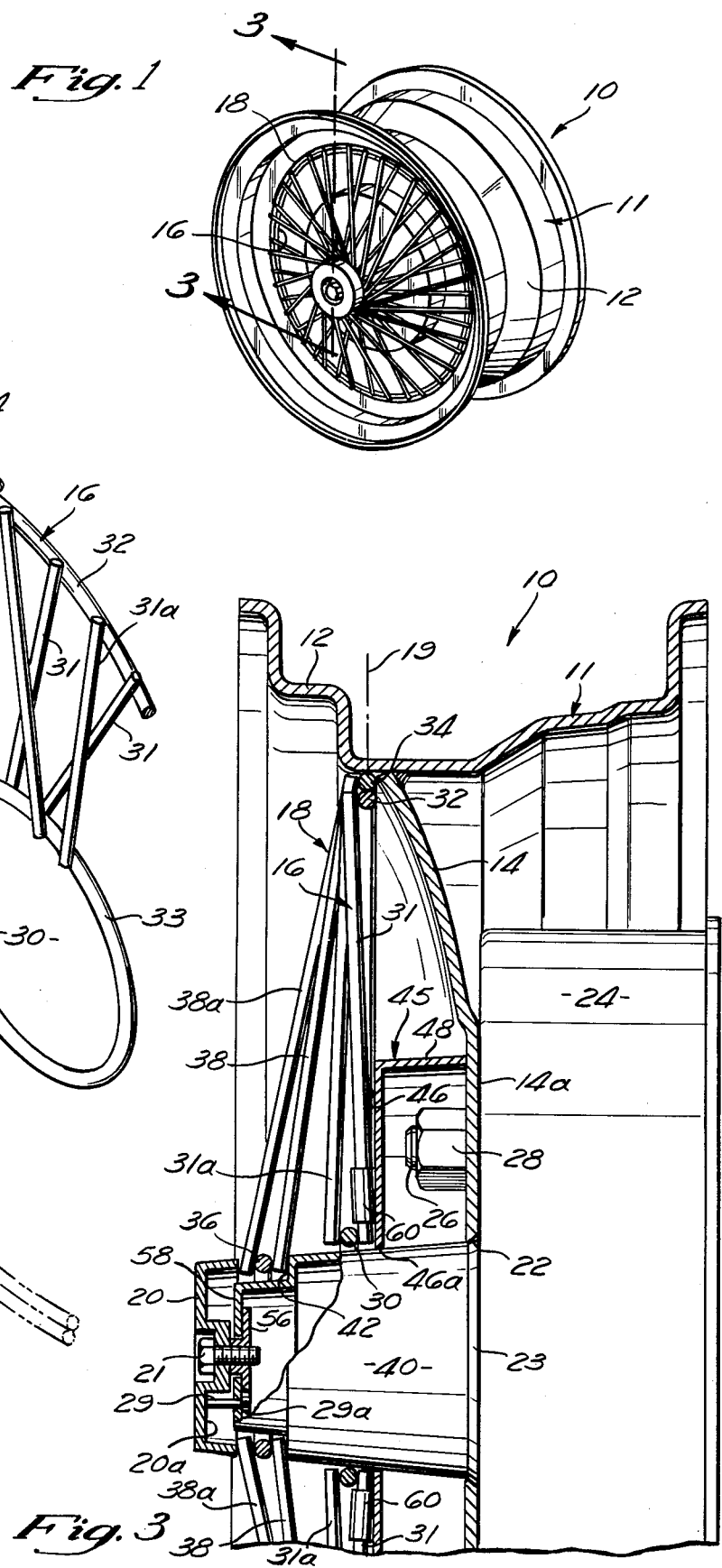

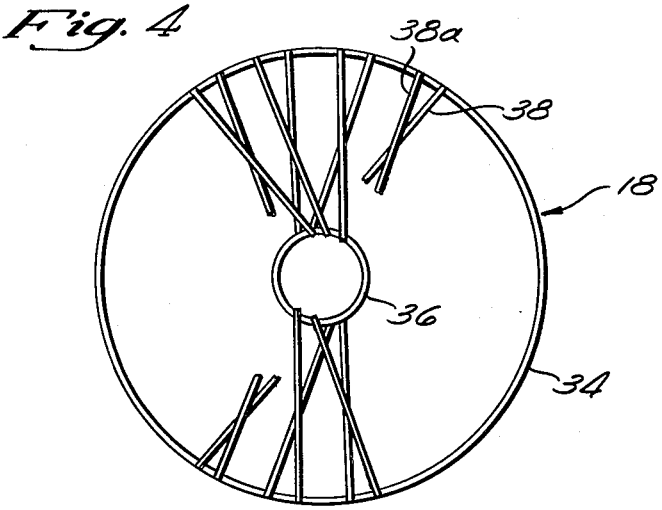
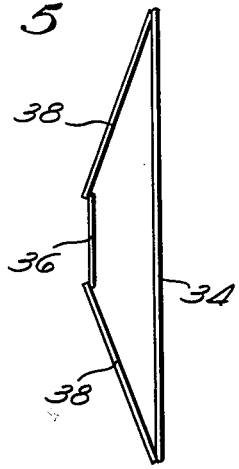
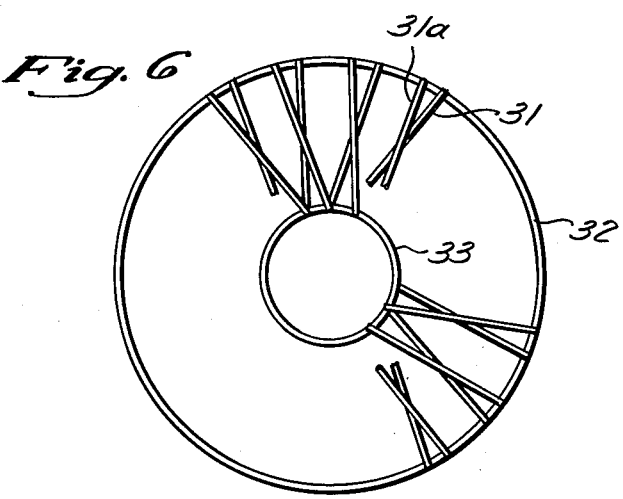
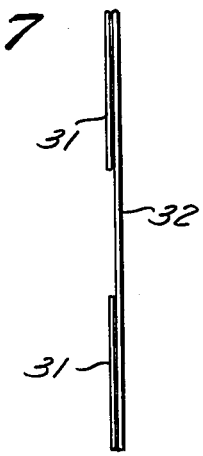
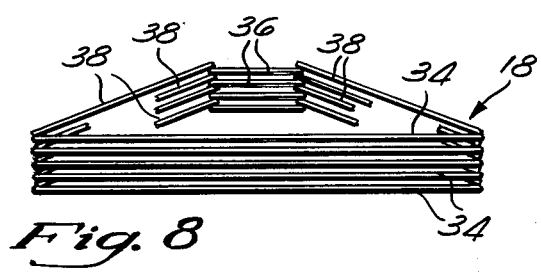
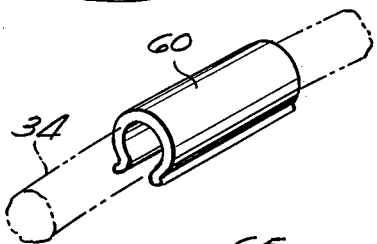
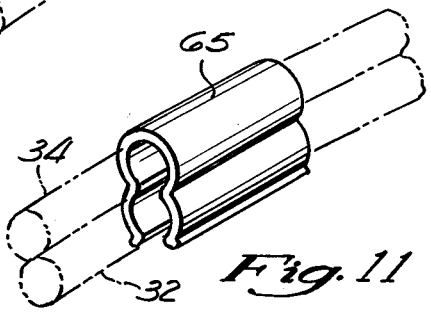

SIMULATED WHEEL COVER ASSEMBLY

FIELD OF THE INVENTION

This invention is generally directed to vehicle wheels and, more particularly, to modular wheel center assemblies for vehicle wheels.

STATEMENT OF THE PRIOR ART

This invention is particularly suitable for making improved modular, double basket, wire wheel centers for vehicle wheels which assembly simulates authentic automotive wire wheels.

Many types of simulated wire wheels have been proposed. Typically, the simulated wire wheel centers of the prior art consist of a one-piece wire basket, and include a single layer of spokes, of either planar or frusto-conical configuration. A one-piece double wire basket structure, formed by combining a planar spoke disc with a conical spoke structure with the two being welded to a common rim is described in what is believed to be a pending utility application filed on or about Mar. 10, 1978 by Raymond C. Brown and issued as U.S. Pat. No. 4,179,163 on Dec. 18, 1979.

Such simulated double wire basket structures more closely approximate the visual and structural complexity and feeling of depth or spacing between an inner and an outer spoke layer, such as is found in many authentic and costly wire wheels. However, such one piece simulated double basket wire wheel define a large enclosed volume, conical in shape and of very low density (since they each consist of multiplanar wire spokes welded together at the rim) and are thus very bulky and expensive to ship and store due to the large amount of space they individually occupy.

The invention herein set forth is directed towards the production of simulated double basket wheel centers of simplified construction to eliminate the needlessly excessive cost of shipping high volume, low density wire wheel structures of the prior art, but without any sacrifice in aesthetic or sacrifice in structural rigidity and performance.

SUMMARY OF THE INVENTION

The improved modular wheel assembly of this invention comprises first, a vehicle wheel body having a tire rim affixed to a central mounting flange, the flange being apertured to receive lug bolts from a vehicle's axle hub and to be secured thereto by lug nuts; second, centrally located module mounting means for inner and outer spoke modules, both of which modules together form the simulated wire wheel center; and thirdly, the inner and outer spoke modules themselves.

The inner spoke module has a radially outer rim which is slightly undersized with respect to the outer spoke module and is thereby readily stably nested or positioned within the outer spoke module, the simulated double basket structure being affixed to the wheel body by the module mounting means. The stable positioning of the inner and outer spoke modules relative to each other are enhanced by resilient members mounted on the radially outer rims, at various portions thereof, such resilient members also preventing metal-to-metal contact of the modules with each other and with the surrounding wheel body structure.

The entire assembly simulates an authentic (i.e., monolithic) wire wheel but is much more economical to manufacture. The assembly of this invention is a further, distinct, advance over the one-piece type of double wire basket wheel center hitherto employed to simulate wire wheel centers. More specifically, the novel two-piece double wire basket of this invention enables high density packaging of the wheel assembly thereby minimizing shipping, storage, and handling expense without the need for any additional structural mounting elements over the prior art, without compromise of the aesthetic or ornamental appearance of the finished assembly, and without any significant increase in the difficulty of assembly by the customer.

Various other advantages of the invention will become apparent from the detailed description which follows.

BRIEF DESCRIPTION OF THE DRAWINGS

FIG. 1 is a perspective view of the assembled modular simulated wire wheel structure of this invention;

FIG. 2 is an enlarged, fragmentary, perspective view of the inner spoke module nestled within the outer spoke module of the wire wheel structure of FIG. 1;

FIG. 3 is a partial cross-section taken along line 3—3 of FIG. 1.

FIGS. 4 and 5 are, respectively, front and end elevational views of the outer spoke module, the views showing only a portion of the spokes of the outer spoke module;

FIGS. 6 and 7 are, respectively, front and end elevational views of the inner spoke module, the front and end elevation views of FIGS. 6 and 7 showing only a portion of the spokes of the said inner spoke module;

FIG. 8 is a side elevational view of the outer spoke modules of FIGS. 4 and 5, shown stacked and nestled for easy handling, packing and shipping;

FIG. 9 is a side elevational view of a series of inner spoke modules arranged in a stack form to conserve space.

FIG. 10 shows one embodiment of an anti-rattle clip attached to a rim (drawn in phantom line); and FIG. 11 shows another embodiment of anti-rattle clip such as may be used to hold together the adjacent rims (drawn in phantom lines) of inner and outer spoke modules of FIGS. 4 and 6.

DETAILED DESCRIPTION OF THE INVENTION

The modular assembly of this invention will be described, in a preferred embodiment, in connection with a structure designed to simulate a wire wheel assembly for automobile wheels. It will be understood, however, that the invention here disclosed is adaptable to many kinds of vehicle wheels where it is desired to create a multilayer, three dimensional ornamental wheel cover at minimum expense and with maximum ease of handling storage, and shipping. It is also understood that this invention is not limited to assemblies comprising only two wire or spoked modules, but includes an assembly of 3, 4 or more interfitting modules which may be spoked or of some other internal configuration.

Turning now to the drawings and especially to FIGS. 1–3, a complete wheel assembly 10, according to a preferred form of this invention, is shown. In general, the complete wheel assembly 10 includes a wheel body 11 having a conventional tire rim 12 and a mounting flange 14 welded to the tire rim. Flange 14 is provided with a bolt-on section 14a having a central aperture 22. The wheel body 11 is affixed to the axle hub 24 of a vehicle, in conventional fashion, by means of lug bolts 26, passing through appropriate lug bolt openings in bolt-on flange section 14a retained by lug nuts 28. The two piece wire basket assembly of this invention, comprising inner and outer spoke modules or basket members 16, 18 is shown particularly in FIGS. 2 and 3 of the drawings.

More particularly, and referring now to FIGS. 2-7 of the drawings, the inner spoke module 16 of the basket assembly is approximately planar, in configuration, as viewed in end elevation (see FIG. 7). The inner spoke module 16 has, preferably, a plurality of crossed spoke pairs 31, 31a extending between radially outer rim 32 and the radially inner rim 33. The radially inner rim 33 defines a central circular aperture or opening 30. The outer spoke module 18 of the basket assembly is frustoconical in configuration as viewed in end elevation (see FIGS. 2 and 5). The outer spoke module 18 also is, preferably, provided with a plurality of crossed spoke pairs 38, 38a extending between radially outer rim 34 and radially inner rim 36. The radially inner rim 36 defines a central circular opening or aperture 37.

As shown in FIGS. 2 and 3, especially, the diameter of radially outer rim 32 of inner spoke module 16 is only slightly undersize with respect to the diameter of radially outer rim 34 of outer spoke module 18 so that, preferably, the inner spoke module 16 will, upon assembly, be readily retained within the plane defined by the radially outer rim 34 of outer spoke module 18 by means of a plurality of double channel molded resilient plastic or rubber clips 65 (see FIG. 11) retaining the rims 32, 34 in the just-described alignment. The same alignment is attained by means of the use of a series of single channel clips or split rings 60 (See FIG. 10) mounted to either or both of the radially outer rims 32, 34 of the basket modules 16, 18. Single channel resilient molded clips 60 are spacedly mounted to rim 34, as shown, by way of example, in FIG. 2. The resilient clips 60 assure stable interfit between the basket modules 16, 18 in spite of possible slight eccentricity of the basket modules, the inner basket rim 32 being wedged or secured within the outer rim 34 by means of the clips 60 (or clips 65). Further, rattle of the two radially outer rims 32, 34 against each other or against the wheel body 11 is prevented by the presence of the clips 60 or 65. The just-described two-piece basket structure very well simulates the one-piece type of double basket wire wheel presently on the market.

The module mounting means for the two-piece basket modules 16, 18 will now be described with particular reference to FIG. 3.

In general, the basket module mounting means comprises a central, outwardly extending, frusto-conical spider cup 40 having a module-retaining shoulder 42 for the radially inner end of the outer basket module 18, a hub cover 45 supported upon an inner portion of the spider cup 40 and enclosing the lug nuts and bolts 26 and 28 (the hub cover 45 also having an outer end wall support surface 46 for the radially inner end of inner basket module 16) and an end cap 20 threadably mounted to the extreme outer end of the spider cup 40 to stably retain the basket modules 16, 18 to the wheel body 11.

In particular, the spider cup 40 extends outwardly from the central circular aperture 22 of bolt-on flange section 14a, the inner open end 23 of spider cup 40 being radially outwardly flared and being removably seated within the rounded edge of aperture 22. Spider cup 40 is thus held against outward movement relative to bolt-on flange section 14a.

Spider cup 40 is provided near its outer end with an annular support shoulder 42 and is also provided with an outermost end wall 58. Annular support shoulder 42 provides a support surface for the radially inner end of the outer spoke module 18. An end cap 20 is threadably mounted to end wall 58 of spider cup 40 by means of a threaded bolt 21 passing through a suitably threaded aperature in end wall 58, the end cap 20 stably retaining the radially inner end of outer spoke module 18 upon tightening of the bolt 21. Lock nut 56 is provided for bolt 21 to prevent untorquing thereof.

The hub cover 45 is of shallow dish shape relative to the depth of spider cup 40 and is provided with a centrally apertured outer end wall support surface 46 terminating in a radially outer, cylindrical, end wall 48. The diameter of the hub cover center aperture 46a is sufficiently great to fit over and be supported by spider cup 40. The hub cover is positioned, in final assembly, so that the radially outer end wall 48 thereof abuts bolt-on flange 14a. The lug nuts and bolts 26, 28 are thereby enclosed by hub cover 45 while the outer end wall 46 of hub cover 45 provides a support surface for inner module 16.

In assembly of the simulated wire wheel of this invention, the spider cap 40 is first removably seated within circular aperture 22 of bolt-on flange 14a of wheel body 11. Hub cover 45 is then slid onto the spider cup 40 until the end wall thereof 48 abuts bolt-on section 14a of mounting flange 14 and thereby encloses lug nuts and bolts 26, 28. The inner spoke module 16 is then mounted over the spider cup 40 and rests on outer end support surface 46 of hub cover 45. A plurality (preferably three or more) channeled clips 60 are mounted to radially inner ends of spokes 31 to prevent metal-to-metal contact with the outer end wall support surface 46 of hub cover 45.

The outer frusto-conical module 18 is then placed over spider cup 45 so that the radially inner end of module 18 abuts, or rests upon, annular shoulder 42 and the radially outer rim 34 of module 18 completely surrounds the slightly undersize radially outer rim 32 of inner module 16, as best shown in both FIGS. 2 and 3. Relative movement of radially outer rims 34, 32 of modules 18, 16 is substantially inhibited because the diameter of radially outer rim 34 is only slightly undersize with respect to wheel body tire rim 12, at the line of juncture 19, thereby enabling the said radially outer rim 34 to be stably held by wheel body tire rim 12 and enabling, as well, the radially outer rim 32 of inner module 16 to be secured within the rim 34. As previously described, a plurality of resilient clips 60 or 65 are also preferably positioned on to either or both rims 34, 32 to prevent rattle of the adjacent rims with each other, and/or surrounding metal parts and to provide a more secure interfit of the rims 34, 32 with each other.

The inner and outer spoke modules 16, 18 are then secured by means of the tightening of end cap 20 onto the radially inner end of outer module 18, by means of threaded bolt 21 as previously described.

The end cap 20 is preferably provided on its inner face 20a with an inwardly extending stop pin 29. Stop pin 29 passes into an eccentric opening 29a in the outer end wall 58 of spider cup 40 as end cap is secured to the spider cup. Pin 29 thereby prevents rotation of end cap 20 relative to spider cup 40 and the wheel assembly 10, as a whole.

It will be noted that the two-piece double wire basket wheel assembly is aesthetically equivalent to an authentic wire wheel monolithic structure in every way yet may be manufactured at far less cost than monolithic wire wheel structures. The securement of the inner and outer modules 16, 18 by the mounting means just described, also affords a reliable and easy assembly means.

FIGS. 8 and 9 illustrate the great amount of space that may be conserved during shipment and storage of these modules by being able to stack like shaped modules (e.g., conical modules in the stack of FIG. 8 separate from the planar modules shown stacked in FIG. 9) thereby achieving packaging densities far higher than were possible with.

It will thus be seen that a simulated wheel center vehicle wheel assembly has been described for a wheel body 11 having a radially outer tire rim of a given diameter and a centrally apertured mounting flange 14 adapted to receive lug bolts engageable by lug nuts 28 for mounting of said wheel body to the axle hub 24 of a vehicle.

The improvements comprise, in combination, a centrally apertured outer non-planar basket module 18 having a radially inner end and a radially outer end including a radially outer substantially annular rim 34 of a first diameter which nests within the tire rim 12; a centrally apertured inner basket module 16 having a radially inner end and a radially outer end including a radially outer substantially annular rim 32 of a second diameter slightly undersize with respect to said radially outer rim 34 of said first diameter; and a mounting means extending outwardly through the centrally apertured mounting flange 14 and extending centrally through each of said central apertures of said inner and outer basket modules 16, 18, and including cap retaining means 20 for securing both said inner and outer basket modules to said wheel body 11 at the radially inner ends thereof whereby the radially outer annular rim 32 of the inner basket module 16 is nested within said radially outer annular rim 34 of said outer basket module 18 and said radially outer annular rims 34, 32 of said outer and inner basket modules are retained closely adjacent the radially outer tire rim 12 to thereby simulate a monolithic multi-basket wheel assembly structure.

The structure here disclosed affords every advantage of the prior art but at lower cost and greater convenience and flexibility.

Many changes and modifications will occur to those skilled in the art without departing from the spirit and scope of this invention. Therefore, applicant intends to be bound only by the claims which follow.

We claim:

1. In a vehicle wheel assembly structure having a wheel body including a radially outer tire rim of a given diameter and centrally apertured mounting flange adapted to receive lug bolts engageable by lug nuts for mounting of said wheel body to the axle hub of a vehicle, the improvement in simulated wheel centers which comprises, in combination:

an individual centrally apertured outer non-planar basket module defining a generally frustro-conical configuration having a radially inner end and a radially outer end including a radially outer substantially annular rim of a first diameter which nests within said tire rim, said individual outer non-planar basket module defining a generally frusto-conical configuration being stackable with substantially similar non-planar basket modules to achieve a plurality of nestably stackable non-planar basket modules;

an individual centrally apertured inner basket module having a radially inner end and a radially outer end including a radially outer substantially annular rim of a second diameter slightly undersize with respect to said radially outer rim of said first diameter, said individual inner basket module being stackable with substantially similar inner basket modules to achieve a plurality of stackable inner basket modules; and a mounting means extending outwardly through said centrally apertured mounting flange and extending centrally through each of said central apertures of said inner and outer basket modules, and including retaining means urging said outer basket inwardly for securing said outer basket module to said wheel body at the radially inner end thereof whereby said radially outer annular rim of said inner basket module is stably retained in nested position within said radially outer annular rim of said outer basket module and said radially outer annular rims of said outer and inner basket modules are retained closely adjacent said radially outer tire rim to thereby simulate a monolithic multi-basket wheel assembly structure.

2. The vehicle wheel assembly structure of claim 1 comprising:

spoke members extending between the radially inner end and the radially outer end of each of said outer basket and inner basket modules.

3. The vehicle wheel assembly structure of claims 1 or 2 further comprising said outer basket module having a substantially frusto-conical shape in end elevational view, and said inner basket module being substantially planar in end elevational view.

4. The vehicle wheel assembly structure of claims 1 or 2 further comprising a plurality of spaced, resilient channel members mounted upon at least one of said radially outer rims of said outer and inner basket modules to prevent contact of said radially outer rims with each other and with said tire rim.

5. The vehicle wheel assembly structure of claims 1 or 2, further comprising a plurality of spaced resilient channel members mounted upon at least one of said radially inner ends of said outer and inner basket modules to thereby prevent contact of said radially inner ends of said inner and outer basket modules with said mounting means.

6. The vehicle wheel assembly structure of claim 1 wherein said retaining means is an end cap threadably mounted to said outwardly extending mounting means, said end cap carrying an off-center inwardly projecting pin means passing through an aperture in said mounting means to prevent rotation of said end cap relative to said mounting means.

* * * * *